Dec. 26, 1939.   J. D. BLAZIER   2,185,012
SPOTLIGHT
Filed Jan. 4, 1937
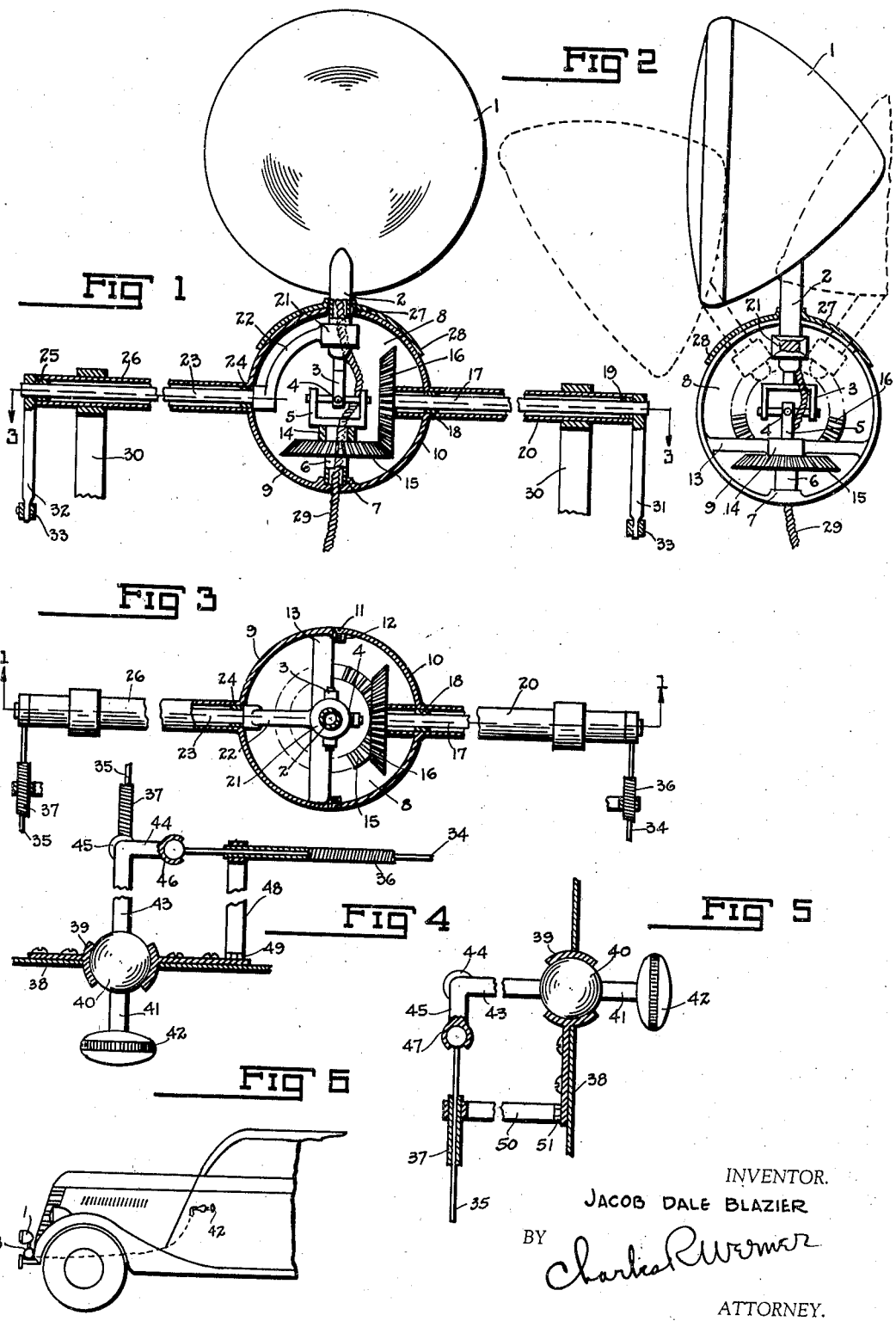
INVENTOR.
JACOB DALE BLAZIER
BY Charles R Werner
ATTORNEY.

Patented Dec. 26, 1939

2,185,012

UNITED STATES PATENT OFFICE 2,185,012

SPOTLIGHT

Jacob Dale Blazier, Wichita, Kans.

Application January 4, 1937, Serial No. 118,968

6 Claims. (Cl. 240—61.13)

This invention relates in general to spotlights and in particular to that type of movable spotlight for use on motor vehicles or similar devices, the spotlight being remotely located with respect to the operator of said vehicle and controlled by means located within the operator's reach.

Normally when used with an automobile the spotlight is mounted at the front end of the vehicle below the headlights, its peculiar construction allowing for a universal movement, that is, adjustment to any angle. The advantages are manifold, as for instance, use of the light while going around curves in the road; focusing the light on the side of the road when meeting approaching cars and use of the light to find house numbers, street names and the like, all these uses being achieved by the vehicle operator from within the vehicle.

The objects of the invention are, first; to provide a spotlight of the class described positioned remotely from the vehicle operator and controlled by means within reach of said operator.

Second; to provide a spotlight and a remote control therefor, whereby said spotlight will respond to movements of the control so that the spotlight may be focused in any desired direction from within the vehicle.

Other objects and advantages of my invention will be apparent by reference to the following description in connection with the accompanying drawing in which:

Fig. 1 is a vertical, longitudinal sectional view of the spotlight and operating mechanism, taken on the line 1—1 of Fig. 3, parts being shown in elevation.

Fig. 2 is a vertical elevation view of one-half of the spotlight operating mechanism, parts being shown in section.

Fig. 3 is a horizontal, cross section view on the line 3—3 of Fig. 1, showing the spotlight operating mechanism, parts being shown in elevation.

Fig. 4 is a fragmentary top plan and partly sectional view of the remote control means for the spotlight.

Fig. 5 is a fragmentary, vertical section view through the remote control, parts being shown in elevation, and Fig. 6 is a fragmentary side elevation of a motor vehicle showing in semi-diagrammatic form the relative locations of the spotlight and the remote control therefor.

Referring now to the drawing by numerals of reference 1 designates a spotlight of usual construction, fixed to a hollow shaft or standard 2 the lower end of which carries U-shaped member 3 of universal joint 4. A similar U-shaped member 5 forms the other half of the universal joint and is affixed to hollow stub shaft 6 resting in bearing 7 of spherical housing 8 formed in two related sections 9 and 10 held together by suitable fastening means 11 passing through member 10 into flange 12 of member 9.

A cross brace 13 provided with bearing 14 is transversely disposed in housing section 9 and carries stub shaft 6. A suitable gear 15 is secured to shaft 6 and meshes with a similar gear 16 on shaft 17 mounted in bearings 18 and 19 in shaft housing 20 which is secured to the spherical housing section 10.

Encircling shaft 2 and in movable relation therewith is a collar 21 attached to arcuate arm 22 extending from shaft 23 held in bearings 24 and 25 positioned in shaft housing 26 secured to section 9 of spherical housing 8.

A slot 27 is provided in spherical housing 8 to allow free movement of shaft 2 which carries a suitable cover or shield 28 covering said slot and preventing entrance of foreign matter into the housing. The electrical cord 29 may pass through the hollow shafts 6 and 2 into the spotlight casing.

The shaft housings 20 and 26 may be attached to the vehicle body or frame or other appurtenance by means of suitable brackets or clamps 30.

The ends of shafts 17 and 23 carry lever arms 31 and 32 to which suitable clevises 33 may be attached. The clevises carry cables 34 and 35 passing through cable housings 36 and 37. Suitably secured to the back of the dash board or instrument panel 38 is clamp member 39 adapted to movably carry ball 40. Extending forwardly from ball 40 is shaft or arm 41 carrying grip or knob 42. Extending rearwardly from ball 40 is arm or lever 43 having a sidewardly extending portion or arm 44 and a downwardly extending member or arm 45. Arm 44 terminates in a ball and socket joint 46, the ball being fastened to the cable 34. Arm 45 has a similar ball and socket joint 47, the ball being fastened to cable 35. Cable housing 36 is held from fore and aft movement by clamp arm 48 suitably hinged at 49 to clamp member 39, for vertical movement only. Likewise, cable housing 37 is suitably supported for horizontal movement only, by clamp arm 50 hinged at 51 to clamp member 39.

As will be apparent, when the knob 42 is moved sideways the cable 34 will be actuated, the hinged clamp 48 remaining stationary while the clamp 50 will move sufficiently to prevent cable 35 from being affected. The same relative condition exists when the knob 42 is moved up or down, in this case the clamp arm 49 being actuated and the clamp arm 50 remaining stationary. The knob 42, of course, may be moved diagonally, circuitously or in any desired direction, the cables 34 and 35 and clamp arms 49 and 50 responding accordingly.

The operation of the device is relatively simple, any movement of the knob 42 to one side or the other of a vertical plane causing movement of cable 34 and any movement of knob 42 above or below a horizontal plane causing movement of cable 35. Movement of cables 34 and 35 produces a relative movement of lever arms 31 and 32, a turning movement being imparted to the spotlight 1 through the medium of shaft 2, universal joint 4, shaft 6, gears 15 and 16, shaft 17 and lever 31; and a fore and aft movement being imparted to the spotlight 1 by shaft 2, movable in slot 27, collar 21, arcuate arm 22, shaft 23 and lever 32. The movements to the spotlight may be imparted independently or simultaneously.

From the foregoing it will be seen that I have provided a spotlight and remote control therefor, whereby the operator of the vehicle on which the light is mounted may focus the light in any desired direction by control means located within reach of the operator.

Obviously, changes in form, proportion and details of construction may be resorted to without departing from the spirit of my invention.

What I claim as new and desire to secure by Letters Patent is:

1. In a spotlight of the class described, a housing, a shaft or standard carrying the spotlight and movably positioned in said housing, a pair of shafts extending into said housing, an extension intermediate the first mentioned shaft or standard and one of the second mentioned shafts whereby a rectilinear movement may be imparted to said first mentioned shaft, gear means intermediate said first mentioned shaft and the other of the second mentioned shafts whereby a rotating movement may be imparted to the first mentioned shaft.

2. The structure as specified in claim 1, each of the second mentioned shafts being operable independently of the other.

3. In a spotlight of the class described, a housing, a shaft or standard carrying the spotlight and movably positioned in said housing, a pair of shafts extending into said housing, an arm carried by one of the second-mentioned shafts and having a free end, the standard being rotatably carried by the free end of said arm whereby a rectilinear movement may be imparted to the standard, the other of the second mentioned shafts being connected to the standard to impart a rotating movement thereto.

4. In a spotlight of the class described, a housing having an elongated slot therein, a shaft or standard carrying the spotlight and movably positioned in said slot, a pair of shafts extending into said housing, an extension intermediate the first mentioned shaft or standard and one of the second mentioned shafts whereby the standard may be moved longitudinally in the slot, the other of the second mentioned shafts being connected to the standard to impart a rotating movement thereto.

5. In a spotlight of the class described, a housing having an elongated slot therein, a shaft or standard carrying the spotlight and movably positioned in said slot, a pair of shafts extending into said housing, an extension intermediate the first mentioned shaft or standard and one of the second mentioned shafts whereby the standard may be moved longitudinally in the slot, the other of the second mentioned shafts being connected to the standard to impart a rotating movement thereto, and a rigid protective cover carried by the standard and slidably movable therewith to cover the slot.

6. In a spotlight of the class described, a housing, a shaft or standard carrying the spotlight and movably positioned in said housing, a pair of shafts extending into said housing, an arm carried by one of the second-mentioned shafts and having a free end, the standard being rotatably carried by the free end of said arm whereby a rectilinear movement may be imparted to the standard, the other of the second mentioned shafts being connected to the standard to impart a rotating movement thereto, and a universal joint between the standard and the last mentioned shaft to permit the second mentioned shafts to operate independently of each other.

JACOB DALE BLAZIER.